3,629,116
STRUCTURED INSULATING MATERIALS
William J. Gartner, Schaumburg, and Charles T. Clark, Des Plaines, Ill., assignors to Desoto, Inc.
No Drawing. Filed May 1, 1969, Ser. No. 821,065
Int. Cl. C04b 43/04; F16l 59/00
U.S. Cl. 252—62         11 Claims

ABSTRACT OF THE DISCLOSURE

A structured insulating material of high infrared reflectivity, low thermal conductivity and good physical properties is prepared by vacuum forming an aqueous slurry comprising from about 10 to about 75 wt. percent of pigmentary potassium titanate, from about 1 to about 35 wt. percent of binder material of which from about 1 to about 25 wt. percent is colloidal silica, and from about 15 to about 89 wt. percent of inorganic fibrous material selected from the group consisting of ceramic fibers, mineral wool and mixtures thereof, all of said percentages being based on solids content.

The slurry deposit on the vacuum formed filter is removed from the filter and dried.

BRIEF SUMMARY OF THE INVENTION

The invention relates to the preparation of structured insulating material of high infrared reflectivity, low thermal conductivity and good physical properties, including good tensile strength and compression modulus. The insulating material may be formed in any desired shape, such as flat plates, cones, domes, or cylinders, and is of sufficient rigidity and strength so that the structures maintain their integrity in the absence of excessive load.

The structures are prepared by vacuum forming techniques, utilizing an aqueous slurry containing from about 10 to about 75 wt. percent of pigmentary potassium titanate, from about 1 to about 35 wt. percent of binder material, of which from about 1 to about 25 wt. percent is colloidal silica, and from about 15 to about 89 wt. percent of inorganic fibrous material selected from the group consisting of ceramic fibers, mineral wool and mixtures thereof, all of said percentages being based on solids content.

After a deposit of sufficient thickness is drawn against the vacuum forming filter or screen, the deposit is removed and dried. Ordinarily, firing is unnecessary, although in some instances, when an organic binder is used, it may be desirable to burn it off.

DETAILED DESCRIPTION OF THE INVENTION

In a typical embodiment of this invention the initial step in the preparation of the slurry is the dispersion of the desired amount of colloidal silica in the water to be used as the slurry medium. As discussed in more detail hereinbelow, the amount of water used in the slurry is not critical, a suitable range being from about 90 to about 99.9 percent of the total slurry weight.

Colloidal silica is commercially available in dispersions running from about 30 to about 50 wt. percent of $SiO_2$; and the 1 to 10 wt. percent of silica used is calculated on the basis of dry $SiO_2$ weight.

Colloidal silica dispersions, as is well known, are dispersions of discrete particles of surface-hydroxylated silica, containing positive ions, such as sodium or ammonium ions in solution. The positive ions induce a negative charge on each silica particle so that the particles repel one another to insure complete dispersion.

A function of the colloidal silica during the preparation of the slurry is to provide the aforementioned positive ions to all of the slurry water so that the other slurry ingredients are added to an anionic slurry medium. Each particle or fiber of solid slurry material therefore acquires a negative charge as it is added to the anionic slurry medium so that thorough and even dispersion of solids is achieved.

The pigmentary potassium titanate and the inorganic fibrous material are then added, preferably stepwise and with constant stirring. The order in which these components are added, and whether they are added successively or together, are not critical.

The pigmentary potassium titanate used in accordance with this invention is a material having extremely small, elongated particles. Typically, more than 99% of the material will pass through a 200 mesh screen and more than 97% will pass through a 325 mesh screen. A typical pigmentary potassium titanate particle might measure about 10 microns in length and have a diameter of about 0.2 micron.

The pigmentary potassium titanate serves several important functions in accordance with this invention, contributing substantially to the improved physical and thermal properties of the final product. A suitable range for the pigmentary potassium titanate is from about 10 to about 75 wt. percent of the total slurry solids, and preferably from about 10 to about 50 wt. percent.

The inorganic fibrous material may be made up entirely of ceramic fibers, entirely of mineral wool, or of mixtures of ceramic fibers and mineral wool in any proportions. It is an important advantage of this invention that mineral wool fibers which are low in cost may be used in structures which may be subjected to relatively high temperatures of the order of about 1700° F. to 1800° F. Ordinarily, mineral wool deteriorates at such elevated temperatures and, in the absence of the pigmentary potassium titanate, a practical upper limit for structured insulating material containing mineral wool would be about 1200° F. to 1300° F.

The ceramic fibers are preferred for applications where temperatures above about 1700° F. to 1800° F. are anticipated. Suitable ceramic fibers include fibers made from fused kaolin and fibers made from fused silica-alumina composites.

The total amount of mineral wool and ceramic fibers may range from about 15 to about 89 wt. percent of the solids content of the slurry, and preferably from about 60 wt. percent to about 89 wt. percent.

After the aforementioned components have been slurried in the anionic slurry medium and after any optional additional binder material (discussed below) has been added, the slurry is flocculated by the addition of a cationic material which neutralizes the anionic slurry medium and the charge on the slurry particles. In one preferred embodiment, the cationic flocculant material may be a cationic starch which also functions as a binder. Other cationic organic binder materials may be used, such as cationic polyvinyl acetate latices and cationic acrylate latices.

Only small amounts of cationic material are required to flocculate the slurry, but where the cationic material also serves as a binder, amounts up to about 35 wt. percent of binder material may be used, including the colloidal silica which, as discussed below, also serves as a binder.

If desired, the slurry may be flocculated by a flocculant material which is not a binder or which is used in insufficient amounts to provide any effective binding action. Water-soluble polymers of acrylamide, or dimethylaminoethyl methacrylate, or copolymers of acrylamide and dimethylaminopropyl acrylamide may be used and may be effective in amounts as low as about 0.05% based on the total weight of slurry solids.

Also if desired, additional binders may be used which are not cationic and which do not have a flocculating effect. Such non-flocculating binders include silicon tetrachloride and calcium aluminate cements. Binders of this type are generally added before the flocculating step, and the total amount of binder (including the colloidal silica) generally runs from about 1% to about 35% by weight, as stated above.

After the slurry has been prepared and flocculated, as described above, it is used to prepare shaped structures by vacuum forming techniques. For the preparation of rectangular flat insulation board, for example, a plate is used containing one or more rectangular filters or screens, each screen being surrounded by a rectangular frame to hold a desired thickness of deposited slurry particles. The plate is lowered into the constantly stirred slurry and suction is applied behind the screen to draw slurry to the screen, passing slurry liquid through the screen and holding slurry solids as a deposit on the screen.

After a suitable time a deposit of slurry particles builds up to the desired thickness and the plate is removed from the slurry while suction is maintained for an additional interval to reduce the water content in the deposited particles.

The thickness of the slurry deposit is largely a function of time in a given system and is relatively unaffected by minor changes in the solids content of the slurry. In successive vacuum forming operations from the same slurry without replenishment of solids thereto, the solids content of the slurry will become progressively lower, but the vacuum forming operation is relatively unaffected by minor variations in solids content. Solids content fluctuations in excess of about 10% from initial values will require adjustment in the time of the vacuum forming operation to obtain products of comparable thickness. Overall, the solids content of the slurry may vary from about 0.1 wt. percent to about 10 wt. percent or more.

After suction is discontinued, air pressure is suitable applied to the underside of the screen to aid in the removal of the slurry deposit therefrom. It has been found in accordance with this invention that the shaped wet slurry deposit has considerable "green" strength so that it may be subjected to normal handling without falling apart. This "green" strength is in part due to the combination of the long fibers of the inorganic fibrous material with the tiny elongated particles of pigmentary potassium titanate and is also aided by certain binder materials such as cationic starch or cationic organic latices.

The slurry deposit may be dried in air, but is preferably dried in an oven at temperatures of the order of 250 to 400° F., the length of the time being dependent on the size and shape of the structure. The colloidal silica, after drying, assumes another function, namely to provide bonding between the fibers of the structure. The colloidal silica thus provides greater finished strength to the product; and this enhancement of finished strength persists to temperatures of about 2300° F.

The structured insulating material, after drying, ordinarily requires no further treatment; and firing is ordinarily unnecessary. However, for certain applications, it may be desirable to remove any organic binder material by burning it off so that it does not burn in place when subjected to burning conditions for the first time in actual use. Also, when silicon tetrachloride is used as a binder, it may be desirable to fire a product at a temperature of about 700° F. to decompose the silicon tetrachloride and provide additional silicon binding to the fibers. In the firing of silicon tetrachloride care must be taken to draw off any effluent fumes since a by-product of the decomposition is hydrogen chloride.

EXAMPLE 0.1 part by weight of a 40% dispersion of colloidal silica is added to 30.5 parts of water maintained in an open vat continuously stirred by a "Lightnin" mixer. 0.64 part by weight of mineral wool, 0.40 part of fused kaolin ceramic fiber and 0.56 part of pigmentary potassium titanate are then added in stepwise increments while stirring is continued. Then 1.0 part of a 4% aqueous dispersion of cationic starch is added and the slurry is flocculated thereby.

A vacuum forming plate containing 6 rectangular screens is lowered into the slurry while the slurry is continuously stirred and vacuum is applied so that slurry solids may be drawn against the screening. Each screen measures 10⅞ by 12¾ inches and is of 60 mesh. Each screen has a frame about 1½ inches in depth.

After about 30 seconds the slurry deposit on each screen is built up to a thickness of about ⅝ inch and the vacuum forming plate is withdrawn from the slurry. Suction is continued for about 10 seconds while the deposits are inspected for holes or other imperfections. If holes are found, additional slurry is poured onto any defective portion of the slurry deposit while said deposit is still under suction.

After the deposits are formed, excess water is drawn off, the suction is turned off and air pressure is applied to the underside of the screens to permit easy removal of the slurry deposits. The slurry deposits at this stage have sufficient "green" strength to be readily handleable without damage. The slurry deposits are stacked in a tray dryer and subjected to drying conditions of about 300° F. for a period of about 1 to 1½ hours.

The final product is a rigid rectangular insulating board suitable for use in the construction of a security box such as the box described in U.S. Pat. No. 3,408,966, issued to William J. Gartner on Nov. 5, 1968 (as the outer fibrous material therein).

The insulating board has a tensile strength of 29.5 p.s.i. and a compression modulus of 370.0 p.s.i. at a density of 19 pounds per cubic foot. The thermal conductivity is 0.75 B.t.u.-in./sq. ft./° F./hr. at a mean temperature of 1000° F. The infrared reflectivity is about 70–85% over a range of 6,000 to 18,000 angstrom units, based on magnesium oxide as 100%.

While the insulating board described above may be fired, if desired, to burn off the starch component therein, such a burn-off is unnecessary where the product is used between the walls of the security box since such a product would not be subjected to burning conditions. In the event that the security box is subjected to high temperatures during a fire, there would be insufficient air between the walls of a security box to permit the starch to burn.

While the invention has been described with respect to the preparation of flat rectangular insulation board, it is to be understood that both the size and shape of the structured material may be altered as required by the utilization of a vacuum forming screen of appropriate size and shape.

For example, the invention has been found to be useful in the preparation of heater pads for support of electrical stove top elements, the pads being generally disc shaped, but containing preformed spiral grooves for the insertion of the heating element. The invention is also useful in the preparation of other structured insulating materials such as tap hole cones for aluminum melting furnaces.

While the invention has been illustrated with respect to its preferred embodiments, it will be understood that various modifications in composition and in process conditions may be made without departing from the scope of the invention, and that the invention is defined in the following claims.

We claim:
1. An aqueous slurry composition comprising an anionic slurry medium containing from about 10 to about 75 wt. percent of pigmentary potassium titanate, from about 1 to about 35 wt. percent of binder material of which from about 1 to about 25 wt. percent is colloidal silica, and from about 15 to about 89 wt. percent of inorganic fibrous material selected from the group consisting of ceramic fibers, mineral wool and mixtures thereof, all of said percentages being based on solids content.

2. The composition of claim 1 wherein water comprises from about 90 to about 99.9% of the total slurry weight.

3. The composition of claim 2 wherein said colloidal silica comprises discrete particles of surface-hydroxylated silica, and wherein sodium ions are in solution in the aqueous phase of said composition.

4. The composition of claim 2 wherein said pigmentary potassium titanate, said silica and said fibrous material are in flocculated condition.

5. The composition of claim 2 wherein said fibrous material is a ceramic fiber made from fused kaolin.

6. The composition of claim 2 wherein said fibrous material is mineral wool.

7. The composition of claim 2 wherein said pigmentary potassium titanate comprises from about 10 to about 50 wt. percent of the solids content and is sufficiently finely divided so that more than 97% of the material passes through a 325 mesh screen.

8. The composition of claim 2 wherein cationic starch is present as a binder material.

9. The composition of claim 8 wherein said cationic starch is present in an amount up to about 10 wt. percent.

10. A structured insulating material comprising a dried deposit having from about 10 to 75 wt. percent of pigmentary potassium titanate material, from about 1 to about 35 wt. percent of binder material, of which from about 1 to about 25 wt. percent is colloidal silica, and from about 15 to about 89 wt. percent of inorganic fibrous material selected from the group consisting of ceramic fibers, mineral wool and mixtures thereof.

11. The structured insulating material of claim 10 in the form of a rectangular sheet.

References Cited
UNITED STATES PATENTS

| | | | |
|---|---|---|---|
| 1,688,849 | 10/1928 | Bellamore et al. | 252—62 X |
| 1,715,977 | 6/1929 | Bates et al. | 252—62 X |
| 1,750,725 | 3/1930 | Miller | 252—62 X |
| 2,808,338 | 10/1957 | Bruno et al. | 106—69 |
| 3,014,872 | 12/1961 | Scott | 252—62 |
| 3,124,853 | 3/1964 | Glaser et al. | 252—62 X |
| 3,367,871 | 2/1968 | Mueller et al. | 252—62 |
| 3,449,141 | 6/1969 | Binkley et al. | 252—62 X |

HAROLD ANSHER, Primary Examiner

U.S. Cl. X.R.

106—69; 117—126 AF, 126 AQ, 126 GF, 126 GQ; 162—152